April 9, 1963
L. HORNBOSTEL
3,084,885
REEL WITH RECIPROCABLE SPOOL
Filed April 22, 1960
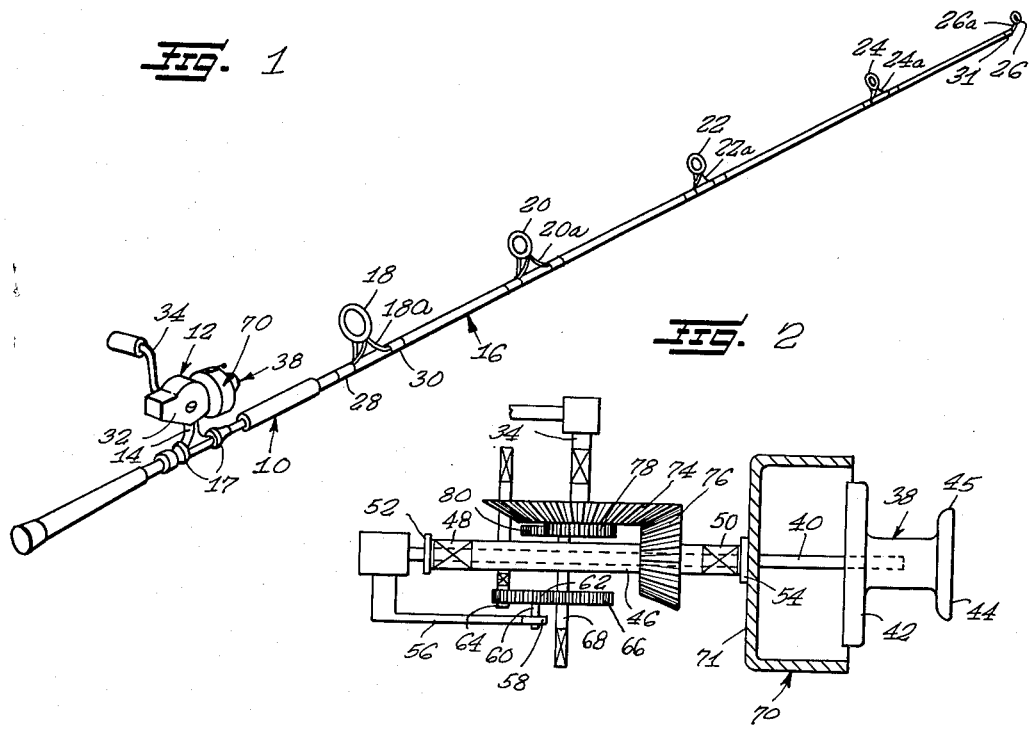
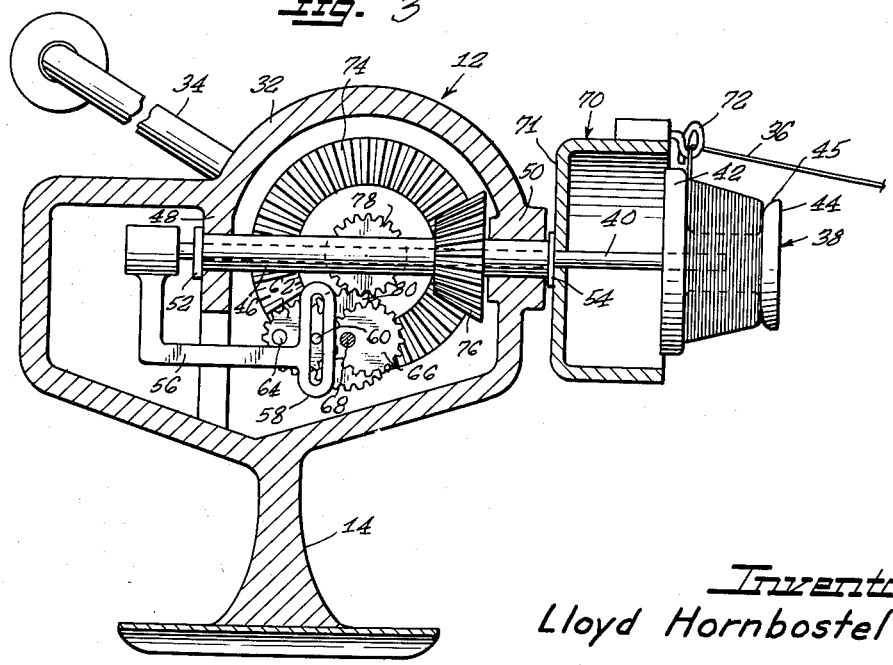
Inventor
Lloyd Hornbostel
By Hill, Sherman, Meroni, Gross & Simpson Attys United States Patent Office 3,084,885
Patented Apr. 9, 1963

3,084,885
REEL WITH RECIPROCABLE SPOOL
Lloyd Hornbostel, 1638 Emerson St., Beloit, Wis.
Filed Apr. 22, 1960, Ser. No. 24,039
3 Claims. (Cl. 242—84.21)

This invention relates to a reel, and more particularly to a reel which affords an axially tapered winding on the spool thereof so as to permit spinning off the line with reduced friction and consequent longer casts.

Heretofore, fishing reels have generally provided for winding the line on the spool in a cylindrical fashion, and as a result, when a cast was made, considerable interference was encountered as the line came off the spool.

The present invention overcomes this difficulty by providing a reel which provides a variable reciprocation of the spool, or of a feed member directing the line onto the said spool, so that a tapered configuration is produced for the line on the spool in the direction of the outer end of a pole on which the reel may be connected. Thus the line will leave the spool with minimal resistance.

In accordance with the invention, a pole may be used in combination with the reel which is formed with successively reduced eyelets for receiving the line, the action of the reel as the line is spun off therefrom in casting being such that a reduced angle or trajectory is achieved for the line relative to the pole and thereby the line will pass easily through the said successively reduced eyelets.

Accordingly, it is an object of the present invention to provide a reel as described which is adapted to produce variable reciprocation of the spool for receiving the line, or of the member for feeding the line onto the spool, thereby to produce a tapered arrangement of the line on the said spool for reduced interference in casting.

Another object of the invention is to provide a device as described wherein the means for effecting the said reciprocation may be elliptical gear means for driving a member connected to either a shaft for the spool, or to a member for feeding the filament onto the spool.

Another object of the invention is to provide a device as described which is highly effective in action and may be operated without special skills or techniques.

Other objects and advantages of the invention will become apparent as the description proceeds in accordance with the drawings in which:

On the drawings:

FIGURE 1 is a perspective view of a fishing rod and reel according to the present invention;

FIGURE 2 is a schematic view of actuating means for use in the reel of the invention; and FIGURE 3 is an enlarged vertical sectional view of the structure shown in FIGURES 1 and 2, disclosing the tapered configuration of the line on the spool.

As shown on the drawings:

Referring now to the drawings, a combination rod and reel 10 is shown according to the invention which includes a reel 12 which may be mounted by means of a T-shaped bracket 14 on a rod 16 by means of rings or sleeves 17, in accordance with the understanding of those skilled in the art. The rod 16 carries a plurality of axially aligned eyelets 18, 20, 22, 24 and 26 connected thereto by wire supports or the like 18a, 20a, 22a, and 24a which may be secured in sleeves such as the sleeves 28 and 30, shown with respect to the eyelet 18, or otherwise suitably connected to the rod, the end bracket 26a being secured by an end cap 31 in the usual manner. Thus a line fed from the reel 12 may be passed through the successive eyelets 18 through 26 in a manner which, as the result of the particular winding feature of the reel, reduces frictional engagement and interference of the eyelets with the line, and permits the line to move directly through the eyelets.

Referring now to FIGURES 2 and 3, the reel 12 includes a frame or housing 32 formed or attached to the bracket 14, and having a crank or handle 34 journalled therein as shown schematically in FIGURE 2. Thus the crank 34 is turned in the usual fashion to wind the line 36 onto a cylindrical spool 38 in a tapered configuration converging in the direction of the outer end of the cone and having a generally frustoconical appearance, as hereinafter further described. The spool 38 may, in one embodiment of the invention, be fixedly secured to a shaft 40; and is provided with an inner relatively large circular end flange 42 and an outer, reduced, circular end flange 44 for receiving the line or filament therebetween. Desirably, the flange 44 has an inner inclined surface 45 which is smoothly flared or curvate in the direction of the outer end of the rod 16 to prevent interference with the line. The shaft 40 extends concentrically through a bearing shaft 46 journalled in the frame 32 by means of bearings 48 and 50 respectively. End bearings 52 and 54 are provided on the shaft 46 to abut the bearings 48 and 50 and restrain the shaft 46 against axial reciprocation. However, the shaft 40 is mounted for axial reciprocation within the shaft 46, as effected by means of an arm 56 extending outwardly and axially relative thereto and carrying at its outer end a slide or track forming member 58 which desirably is disposed in perpendicular relationship to the shafts 40 and 46. A pin 60 is received in the track 58 for reciprocation therealong, and this pin is fixedly secured to an elliptical gear 62, preferably in offset relationship to the center thereof. The disk or gear 62 is mounted eccentrically on a journal shaft 64 connected in predetermined spaced relationship to the pin 60, and a second elliptical disk or gear 66 is journalled eccentrically in the frame structure 32 by means of a shaft 68 as shown more particularly in FIGURE 2. The gear 66 is therefore effective to drive the gear 62 at a variable rate of speed; and the pin 60 will reciprocate the arm 56 axially at a rate of speed which is also variable, as determined in part by the location of pin 60. Thus the spool has a relatively short dwell as it is moved to the left as carried by the said arm 56 acting on the inner shaft 40; but a correspondingly long dwell as it is moved to the right or toward the outer end of the rod 16, as shown in FIGURE 3. The relationship between the gears 62 and 66 is therefore such as to define an evenly tapered configuration of the line on the spool as the line is turned onto the spool by a feed arm 70, so that the spool moves at an increasing rate in one direction, i.e., away from the rod, and at a decreasing rate in the other direction or toward the rod.

However, cam disks may be used instead of the gears or disks 62 and 66 to produce an equivalent motion, within the scope of the invention.

The feed or pickup member 70 is mounted on the end the shaft 46 adjacent the spool 38 and carries an outwardly positioned loop 72 for feeding the line onto the spool or receiving it therefrom. Desirably, the feed or pickup member 70 has a cup-shaped configuration with the rear wall 71 thereof fixedly secured to the bearing 54 on the shaft 46.

The crank 34 serves to rotate the shaft 46 about its axis and for this purpose the crank has affixed thereto a relatively large beveled gear 74 meshing with a complementary beveled gear 76 concentrically secured to the shaft 46. Thereby rotation of the crank 34 effects relatively fast rotation of the shaft 46 and of the feed or pick up member 70. The relationship between the speed of rotation of the feed member 70 and the differential rate of reciprocation of the shaft 40 into and out of the fed member may be varied as desired, but, as stated, is effective to dispose the line on the spool 38 in an evenly frustoconical relationship tapering in the direction of the outer end of the rod 16.

Referring again to FIGURE 2, it will be seen that the elliptical gear 66 may be driven from a relatively small gear 78 secured to the gear 74, which in turn may drive a larger gear 80 carrying the shaft for driving the gear 66. The ratios between these several gears may also be calibrated as desired to effect a speed of reciprocation of the shaft 40 correlated with the rotation of the arm 70 and the variation in the dwell of the shaft 40 and spool 38. Further, it will be understood that the feed element 70 may be reciprocated and the spool element 38 rotated to effect a tapered or longitudinally reducing winding on the spool, within the scope of the invention.

Accordingly, when a cast is made, the line will be taken off the spool 38 and fed through the eyelet 72 without the usual interference, because of the tapering disposition of the line at its outer surfaces on the spool. As a result, much longer casts will be effected and with the same amount of skill and effort. In accomplishing such, the line will be fed off the spool in smooth, low trajectory casts approaching a parallel relation with the rod 16, and the individual successively reduced eyelets 18 through 26 will coact to receive the line in the conformation thus provided without interference therewith so as to further increase the length of casts.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. In a reel having a support frame, a first shaft journaled in said support frame in axially fixed relationship, a feed member on said shaft, a second shaft received coaxially through said first shaft, a spool carried by said second shaft in operative relationship for receiving filament or the like from said feed member, means for rotating said first shaft, a first gear journaled eccentrically in said support frame, means driving said first gear and driven by said means for rotating said first shaft, a second gear journaled eccentrically in said support frame, and linkage means connecting said second gear and said second shaft to reciprocate said second shaft for decreasing dwell in one direction and increasing dwell in the other direction, said linkage means including a pin on said second gear and an arm on said second shaft having a slot receiving said pin for reciprocation of said pin therein.

2. In a reel having a frame, a first shaft journaled in said frame in axially fixed relationship, a second shaft mounted for coaxial movement relative to said first shaft, a feed member on one of said shafts and a spool on the other of said shafts for receiving a filament or the like from said feed member, first gear means on one of said shafts, second gear means for driving said first gear means, third gear means driven by said second gear means, fourth gear means driven by said third gear means on an eccentric axis, fifth gear means driven by said fourth gear means on an eccentric axis and linkage means connecting said second shaft to said fifth gear means to move said second shaft at an increasing rate in one direction and at a decreasing rate in the other direction.

3. A fishing reel which comprises a casing having an integral bracket adapted to be fixedly mounted on a fishing rod to position the casing in longitudinal alignment with the rod, a hollow shaft journaled longitudinally in said casing, a crank journaled in said casing and projecting from a side thereof, a first gear train driven by said crank for rotating said hollow shaft, a second shaft extending through said hollow shaft in relatively rotatable and slidable relation therewith, a spool on the end of said second shaft outside of said casing and having a large diameter radial flange at the base thereof and a small diameter radial flange facing the tip end of a fishing rod when the casing is mounted on the rod, a mandrel portion on said spool between said flanges to receive a filament therearound, a filament pickup member mounted on said hollow shaft and positioned to direct filament onto the spool, a second gear train driven by said crank including a pair of intermeshed eccentrically mounted elliptical gears, a pin member driven by said gears to move in an orbital path, a slotted link receiving said pin to transmit only the longitudinal movement of said pin in its orbital path to said second shaft for reciprocating said spool relative to said filament pickup member, and said elliptical gears and pin driving said spool through said link and second shaft to reciprocate at a non-uniform rate to have a prolonged dwell when the large flange of the spool is adjacent the pickup member to produce a frusto conical winding on the spool from which the filament spins over the small flange of the spool toward the tip of the fishing rod without substantial interference when released from the pickup during casting.

References Cited in the file of this patent

UNITED STATES PATENTS

| | | |
|---|---|---|
| 1,135,090 | Allen | Apr. 13, 1915 |
| 2,628,444 | Oak | Feb. 17, 1953 |
| 2,700,285 | Bellini | Jan. 25, 1955 |
| 2,805,509 | Inglis | Sept. 10, 1957 |
| 2,836,921 | Lynch | June 3, 1958 |
| 2,872,751 | Mayfield | Feb. 10, 1959 |

FOREIGN PATENTS

| | | |
|---|---|---|
| 617,477 | Canada | Apr. 4, 1961 |
| 942,132 | France | Sept. 13, 1948 |
| 1,151,894 | France | Aug. 16, 1957 |
| 1,176,814 | France | Apr. 16, 1959 |
| 944,828 | Germany | June 21, 1956 |
| 619,639 | Great Britain | Mar. 11, 1949 |
| 781,302 | Great Britain | Aug. 14, 1957 |
| 512,536 | Italy | Feb. 1, 1955 |
| 286,378 | Switzerland | Feb. 16, 1953 |